Oct. 20, 1959 N. H. SCHLEMM, JR 2,909,681
PULSE GENERATOR
Filed Sept. 11, 1957

WITNESSES:
Bernard R. Gieguey
Wm. B. Sellers.

INVENTOR
Norman H. Schlemm, Jr.
BY
ATTORNEY

United States Patent Office 2,909,681
Patented Oct. 20, 1959

2,909,681

PULSE GENERATOR

Norman H. Schlemm, Jr., Silver Spring, Md., assignor to Westinghouse Electric Corporation, East Pittsburgh, Pa., a corporation of Pennsylvania Application September 11, 1957, Serial No. 683,422

4 Claims. (Cl. 307—106)

This invention relates to magnetic pulse generators and more particularly to a magnetic pulse generator for generating pulses of one polarity which persist for long time durations.

It is an object of this invention to provide a new and improved pulse generator.

More specifically, an object of the invention is to provide a magnetic pulse generator which will produce voltage pulses of one polarity having a time duration which is less than 360° but more than 180° of an alternating current input signal.

A further object of the invention is to provide a pulse generator employing non-linear passive circuit elements exclusively rather than active elements such as vacuum tubes and transistors which have the disadvantages of: (1) requiring more power than comparably passive devices, (2) circuit instability over temperature extremes, and (3) unreliability under severe environmental conditions.

The above and other objects and features of the invention will become apparent from the following detailed description taken in connection with the accompanying drawings which form a part of this specification and in which.

Figure 1:
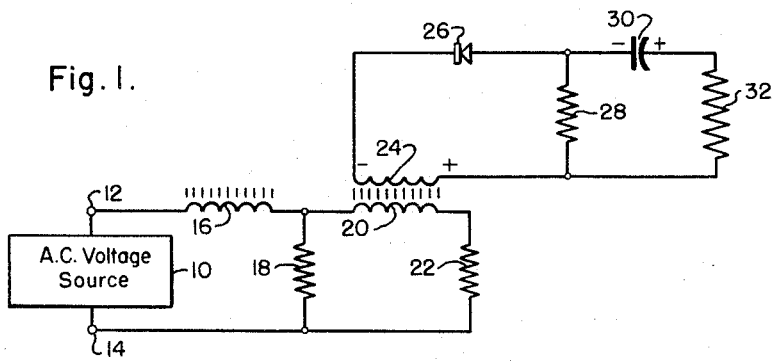
Fig. 1 is a schematic circuit diagram of one embodiment of the invention.

Referring now to Fig. 1, the embodiment of the invention shown comprises a source of alternating current voltage 10 having a pair of output terminals 12 and 14. In series between terminals 12 and 14 are connected a first saturable inductive device 16 and a resistor 18. A second saturable inductive device 20 and a second resistor 22 are connected in series across the resistor 18.

Inductively coupled to the core of the saturable inductive device 20 is a winding 24 having its opposite terminals connected by means of a unidirectional current path which includes a rectifier 26 and a resistor 28. A capacitor 30 and a load impedance 32 are connected in shunt with resistor 28 to complete the circuit, substantially as shown.

Each of the inductors 16 and 20 is wound on a core of square loop hysteresis material. As is well known, core materials of this type present a sharp cut-off point between conditions of saturation and unsaturation such as a nickel-iron alloy disclosed on page 132 of "Ferromagnetism," by Bozorth and published by D. Van Nostrand Company (1951). When the flux density in a core is such that the core is saturated, it will, of course, present a much lower impedance than when unsaturated. The flux density in an inductor having a core of square loop hysteresis material depends upon the integral $e \int dt$, where $e$ is the instantaneous voltage applied to the inductor and $t$ is time. Thus, the saturation level of flux density depends upon both applied voltage and the time duration of that voltage. As the voltage is increased, the time required for saturation is decreased and vice versa. Considering the integral $e \int dt$, it will be apparent that flux density may be measured in volt-seconds.

Figure 2:
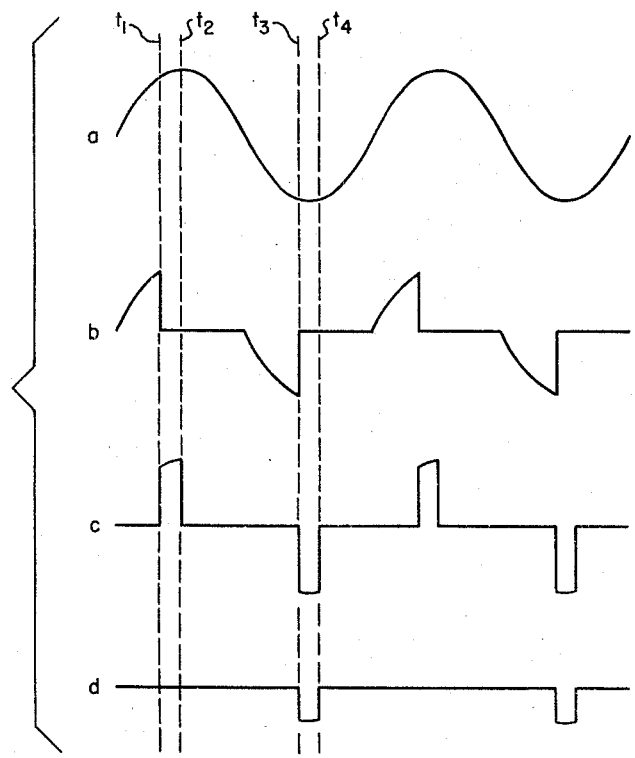
Fig. 2 illustrates waveforms appearing across various points in the circuit of Fig. 1.

In operation, when an alternating current voltage such as that shown by waveform $a$ in Fig. 2 is applied across input terminals 12 and 14, almost all of the voltage will initially appear across inductor 16. At time $t_1$ shown in Fig. 2, inductor 16 will saturate so that the voltage across the reactor (waveform $b$) will drop to substantially zero while the remainder of the voltage is developed across resistor 18. This voltage is, in turn, impressed across inductor 20 to drive its core toward saturation. Thus, at time $t_1$, the voltage across inductor 20 (waveform $c$) jumps to the supply voltage until it saturates at time $t_2$ when the voltage across this inductor again drops to zero. On the next half cycle the process is repeated except that the polarity of the voltage pulse across inductor 20 is now reversed.

The action of saturable reactors 16 and 20 is similar to that of a switch. While reactor 16, for example, is absorbing volt-seconds prior to saturation, it acts like an open switch impressing no voltage across resistor 18. When it saturates, its action is similar to that of a closed switch which applies the voltage from source 10 across resistor 18. The inductor remains saturated, or the switch remains closed, until the input voltage changes polarity to reset the inductor (i.e. drive it from saturation).

During the time that inductor 20 is absorbing volt-seconds, it acts as a transformer to impress voltage across winding 24. It can be readily seen that when the polarity of the voltage impressed across winding 24 is as indicated in the drawing, current will pass through rectifier 26 and resistor 28. When the polarity is reversed, however, the rectifier will not conduct. Consequently, only the negative voltage pulses in waveform $c$ will be impressed across resistor 28. When rectifier 26 conducts, capacitor 30 will be charged with the polarity indicated in the drawing. The charge on the capacitor will leak off over a time interval determined by the RC time constant of capacitor 30 and resistor 28. If the time constant is long enough, very little voltage will leak off capacitor 30 between successive negative voltage pulses passing through rectifier 26. Assuming that capacitor 30 is charged at time $t_3$, the negative voltage pulse will lower the voltage across load impedance 32 (waveform $d$), but it will not charge the capacitor 30 since it is saturated, or almost saturated. Consequently, at time $t_4$ when the negative voltage pulse is removed, the voltage across resistor 32 will rise to its initial value. The resulting waveform appearing across output impedance 32 is a series of square wave voltage pulses of long time duration. Actually, the voltage level of the tops of the square wave pulses will not remain absolutely constant since part of the charge on capacitor 30 will leak off during successive negative voltage pulses from winding 24. For all practical purposes, however, it may be assumed that the voltage level of the peak of the square wave is constant.

Although the invention has been shown in connection with a certain specific embodiment, it will be readily apparent to those skilled in the art that various changes in form and arrangement of parts may be made to suit requirements not departing from the spirit and scope of the invention.

I claim as my invention:

1. In apparatus of the type described, a pair of terminals adapted for connection to a source of alternating current voltage, a first saturable inductive device and a first resistor connected in series between said terminals, a second saturable inductive device and a second resistor connected in series between opposite terminals of said first resistor, winding means inductively coupled to said second inductive device, a rectifier and a resistor connected in series with said winding means, and a capacitor and a load impedance connected in series between opposite terminals of said last-mentioned resistor.

2. In apparatus of the type described, a pair of terminals adapted for connection to a source of alternating current voltage, a first saturable inductive device and a first impedance element connected in series between said terminals, a second saturable inductive device and a second impedance element connected in series between opposite terminals of said first impedance element, winding means inductively coupled to said second inductive device, a undirectional current path connecting opposite terminals of said winding means, an impedance element included in said path, and a capacitor and a load resistor connected in series between opposite terminals of said latter mentioned impedance element.

3. A pulse generator comprising a pair of terminals adapted for connection to a source of alternating current voltage, a first saturable inductive device and a first resistor connected in series between said terminals, a second saturable inductive device and a second resistor connected in series between opposite terminals of said first resistor, said first and second saturable inductive devices having a magnetic core of a substantially rectangular hysteresis material, winding means inductively coupled to said second inductive device, and a rectifier and a load impedance connected in series between opposite terminals of said winding means.

4. A pulse generator comprising a source of alternating current voltage, a first saturable inductive device and a first resistor connected in series with said source of alternating current voltage, a second saturable inductive device and a second resistor connected in series between opposite terminals of said first resistor, said first and said second saturable inductive devices having magnetic cores of substantially rectangular hysteresis material, winding means inductively coupled to said second inductive device, a rectifier and a resistor connected in series with said winding means, and a capacitor and a load resistor connected in series between opposite terminals of said last-mentioned resistor.

References Cited in the file of this patent

UNITED STATES PATENTS

| | | |
|---|---|---|
| 2,104,336 | Tuttle | Jan. 4, 1938 |
| 2,787,755 | Smith | Apr. 2, 1957 |